UNITED STATES PATENT OFFICE.

RICHARD BISHOP MOORE, OF DENVER, COLORADO.

PROCESS OF EXTRACTING VANADIUM, URANIUM, AND RADIUM FROM ORES.

1,165,692.

No Drawing.

Specification of Letters Patent. Patented Dec. 28, 1915.

Application filed October 7, 1913. Serial No. 793,971.

(DEDICATED TO THE PUBLIC.)

*To all whom it may concern:*

Be it known that I, RICHARD BISHOP MOORE, a resident of Denver, in the county of Denver and State of Colorado, have invented certain new and useful Improvements in Processes of Extracting Vanadium, Uranium, and Radium from Ores; and I do hereby declare the following to be a full, clear, and exact description of my invention.

This application is made under the act of March 3, 1883, chapter 143 (U. S. Statute XXII, p. 625) and the invention herein described and claimed may be used by the Government of the United States or any of its officers or employees in the prosecution of the work of the United States or by any person in the United States without payment of any royalty thereon.

This invention relates to a process of treating ores and more particularly to a process of extracting vanadium, uranium and radium from ores containing the same, such as carnotite ores.

The object of my invention is a process of treating ores whereby the radium content is rendered more readily soluble and is easily recovered.

In carrying out my process I proceed substantially as follows: The ore, being ground to a suitable degree of fineness, is leached with a hot solution containing an alkali carbonate and an alkali hydrate. The alkali salts used are preferably those of sodium. The temperature of the solution is preferably between 80 and 90 degrees centigrade. The result of this treatment is to convert the vanadium into soluble sodium vanadate and the uranium into sodium uranate, which latter is however comparatively insoluble. The uranium content hence remains in the insoluble residue. The radium content of the ore is converted by the sodium carbonate in the solution into radium carbonate and is thereby rendered soluble in the subsequent acid leaching step of the process. The alkaline solution containing the vanadium is decanted or filtered from the residue and the residue is washed to remove all soluble matter including vanadium compounds and soluble sulfates. The vanadium bearing solution is stored for further treatment to recover the vanadium. The insoluble residue is then treated with dilute hydrochloric or nitric acid which may be hot or cold. The sodium uranate and the radium salts are dissolved and converted into chlorids or nitrates. The solution is decanted or filtered from the residue and stored for further treatment to recover uranium and radium. The insoluble residue may then be leached with a hot or cold mineral acid such as nitric or hydrochloric acid which need not be chemically pure and may be stronger than the acid used for leaching out the radium and uranium. By this means any remaining vanadium will be recovered.

Having fully described my invention, what I claim as new and desire to secure by Letters Patent is:

1. The herein described process of extracting values from ores containing vanadium, uranium and radium which consists in leaching the ore with a solution containing an alkali carbonate and an alkali hydrate, recovering vanadium from the solution, leaching the residue with an acid solution and recovering uranium and radium from the solution.

2. The herein described process of extracting values from ores containing vanadium, uranium and radium, which consists in leaching the ore with a solution containing sodium carbonate and sodium hydrate, recovering vanadium from the solution, leaching the residue with a hydrochloric acid solution and recovering uranium and radium from the solution.

In testimony whereof, I have signed this specification in the presence of two subscribing witnesses.

RICHARD BISHOP MOORE.

Witnesses:
KARL L. KITHIL,
TRACY E. MULLIGAN.

Copies of this patent may be obtained for five cents each, by addressing the "Commissioner of Patents, Washington, D. C."